US009054951B2

(12) United States Patent
Patel et al.

(10) Patent No.: US 9,054,951 B2
(45) Date of Patent: Jun. 9, 2015

(54) DETECTING AND AVOIDING ROUTING LOOPS WITH BGP ROUTE SERVER EXTENSIONS

(75) Inventors: Keyur Patel, San Jose, CA (US); Robert Raszuk, Warsaw (PL); Ryan Bickhart, San Francisco, CA (US); Alton Lo, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 577 days.

(21) Appl. No.: 13/098,628

(22) Filed: May 2, 2011

(65) Prior Publication Data

US 2012/0281539 A1 Nov. 8, 2012

(51) Int. Cl.
  *H04L 12/28* (2006.01)
  *H04L 12/751* (2013.01)
  *H04L 12/715* (2013.01)
(52) U.S. Cl.
  CPC .............. *H04L 45/026* (2013.01); *H04L 45/04* (2013.01)
(58) Field of Classification Search
  CPC .............................. H04L 45/026; H04L 45/04
  See application file for complete search history.

(56) References Cited

U.S. PATENT DOCUMENTS

2007/0165532 A1* 7/2007 Retana et al. ................. 370/241
2008/0101392 A1* 5/2008 Zhang et al. .................. 370/401
2010/0080131 A1* 4/2010 Ward et al. .................... 370/248

OTHER PUBLICATIONS

Cisco Systems, Inc., entitled "BGP Case Studies, Document ID: 26634", © 2009-2010, (70 pgs).
BGP Routing and As-Path (1 page).
Border Gateway Protocol from Wikipedia, last modified Dec. 19, 2010, (13 pgs).
Cisco Systems, Inc., entitled "IP Routing BGP Case Studies" dated Oct. 30, 2008, (49 pgs).
Defining AS Path Regular Expression, © 1999-2010, (6 pgs).
Cisco Systems, Inc., entitled "BGP Aggregate Withdraw" by R. Raszuk et al., dated Oct. 2005, (9 pgs).
Cisco Systems, Inc., entitled "A Border Gateway Protocol 4 (BGP-4)" by Y. Rehkter et al., dated Mar. 1995, (58 pgs).
RFC 1771, entitled "A Border Gateway Protocol $_4$ (BGP-$_4$)", faqs. org, (52 pgs).
RFC 4271, entitled A Border Gateway Protocol 4, by Y. Rekhter et al., dated Jan. 2006, (105 pgs).
Cisco Systems, Inc., entitled "Understanding Route Aggregation in BGP, Document ID: 5441", dated Aug. 10, 2005, (7 pgs).

* cited by examiner

*Primary Examiner* — David Oveissi
(74) *Attorney, Agent, or Firm* — Hickman Palermo Becker Bingham LLP

(57) ABSTRACT

In an embodiment, a method comprises: receiving, at a data packet router, a path advertisement comprising information about an available path; determining whether the path advertisement comprises an originator identifier of an originator of the available path; in response to determining that the path advertisement comprises the originator identifier of the originator of the available path, determining whether the originator identifier of the available path is a router identifier of the data packet router, and in response to determining that the originator identifier of the available path is the router identifier of the data packet router, not accepting the path advertisement; wherein the method is performed by one or more processors of the data packet router.

12 Claims, 4 Drawing Sheets

DETECTING AND AVOIDING ROUTING LOOPS WITH BGP ROUTE SERVER EXTENSIONS

TECHNICAL FIELD

The present disclosure is generally related to communications between routers, switches or other computers in a distributed network infrastructure. The disclosure relates more specifically to avoiding looping of route advertisements in a computer network implementing BGP route server extensions.

BACKGROUND

Border Gateway Protocol (BGP) is an inter-domain network routing protocol that provides means for advertising communications routes in networks. One of the features of a conventional BGP is the ability to detect route loops. For example, if a BGP router receives a route advertisement, then with BGP the router can detect whether the route advertisement was already processed by the router and thus, whether the advertisement can be disregarded. BGP is described, for example, in "Terminology for Benchmarking BGP Device Convergence in the Control Plane," RFC 4098, by H. Berkowitz et al., published in June 2005, and in "Border Gateway Protocol 4 (BGP-4)," RFC 4271, by Y. Rekhter, T. Li, and S. Hares, published in January 2006, and this disclosure assumes familiarity with BGP.

BGP can detect route loops using the AS_PATH attribute list, which is part of a route advertisement. For example, a router can determine that a route advertisement has been looped back to the router if, upon inspecting an AS_PATH attribute list included in the advertisement, the router determines that an autonomous system identifier of the router was already included in the AS_PATH attribute lists.

However, the situation may be complicated in the case of a route reflector. Route server extensions for route reflectors prohibit a BGP reflector from inserting the router's local autonomous system identifier, or a BGP group identifier, into an AS_PATH attribute list when the router reflects a route update to its external BGP clients. Because of this limitation, testing the presence of the autonomous system identifier in the AS_PATH attribute list may not conclusively detect routing loops.

One reason that a route reflector does not append its own autonomous system identifier to an AS_PATH attribute in a route advertisement is that the route reflector is expected to reflect the advertisement in a transparent way and without adding any self-authentication information to the route advertisement.

Further, the presence of a reflector's identifier in an AS_PATH attribute list could undesirably change a best-path calculation. For example, if an autonomous system identifier of a route reflector were included in an AS_PATH attribute list, then the identifier could be unnecessarily included in the best path calculation, or could be unnecessarily included in the best path calculation multiple times. The best paths calculated in such circumstances could be inaccurate.

By preventing a route reflector from adding the reflector's autonomous system identifier to an AS_PATH attribute list of the reflected route, the best-path behavior may be preserved. Because the autonomous system identifier of the route reflector is not added to the AS_PATH attribute list, the route reflector's identifier does not interfere with the best-path selection process performed by the routers.

However, because autonomous system identifiers of route reflectors are not appended by the route reflectors to AS_PATH attribute lists, determining whether a route advertisement is looped using a conventional loop detection process that inspects the AS_PATH attribute lists can be unreliable.

DETAILED DESCRIPTION

Figure 1:
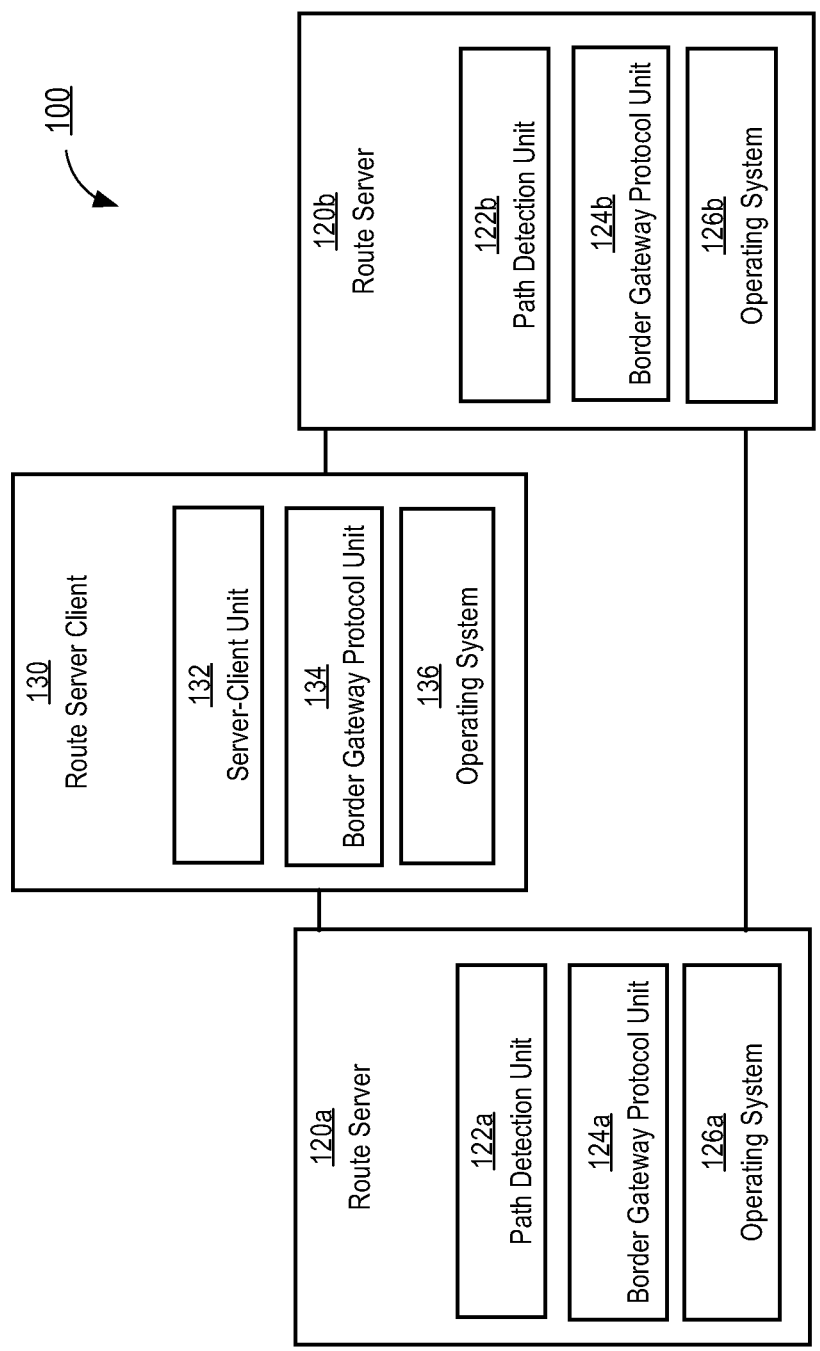
FIG. 1 illustrates an embodiment of route servers communicating with a route server client.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview of a System
    3.0 Process of Detecting and Avoiding Routing Loops
    4.0 Implementation Mechanisms—Hardware Overview
    5.0 Extensions and Alternatives

1.0 GENERAL OVERVIEW

In an embodiment, a method for determining whether to accept or disregard a route advertisement received by a route reflector that implements BGP route server extensions is disclosed. A route advertisement may be disregarded if the advertisement has been already looped. If a received route advertisement can be disregarded, a router can avoid superfluous processing of the advertisements. By identifying the advertisements that have been already reflected within the router's autonomous system or the router's BGP group, looping of the redundant advertisements by the routers can be avoided.

In an embodiment, a method allows a router to conserve the router's own computational and storage resources, such as CPU, memory and other resources required to accept and process the route advertisement, to address the situation in which route advertisements could be continuously disseminated within the same autonomous system causing the advertisements to loop between the same nodes. For example, a reflector might not detect whether a particular route advertisement has been already reflected within the router's autonomous system, and could needlessly continue processing the advertisement by expending the reflector's own resources, such as CPU power or memory.

In an embodiment, a loop detection method allows a router to efficiently determine whether the router has already advertised a particular route advertisement, and if so, to preserve resources of the router by not accepting and not processing a repeated advertisement.

In an embodiment, a method comprises receiving, at a data packet router, a path advertisement comprising information about an available path; determining whether the path advertisement comprises an originator identifier of an originator of the available path; in response to determining that the path advertisement comprises the originator identifier of the originator of the available path, determining whether the originator identifier of the available path is a router identifier of the data packet router, and in response to determining that the originator identifier of the available path is the router identifier of the data packet router, not accepting the path advertisement.

In an embodiment, the method further comprises modifying the path advertisement in response to determining that the path advertisement does not comprise the originator identifier of the originator of the available path, to include the router identifier of the data packet router as one of attributes of the path advertisement.

In an embodiment, the method further comprises accepting the path advertisement in response to determining that the path advertisement comprises the originator identifier of the originator of the available path but the originator identifier of the available path is not the router identifier of the data packet router.

In an embodiment, the method further comprises determining whether the path advertisement comprises a border gateway protocol aggregator attribute value (which may be denoted, for example, as BGP_AGGREGATOR, or using another suitable label) in the path advertisement, and whether the BGP_AGGREGATOR value is an autonomous system identifier of an autonomous system that originated the path advertisement.

In an embodiment, the path advertisement further comprises a border gateway protocol aggregator attribute (BGP_AGGREGATOR) value indicating the originator of the path advertisement.

In an embodiment, a non-transitory computer-readable storage medium stores one or more sequences of instructions which, when executed by one or more processors, cause the one or more processors to perform the processes described herein.

In an embodiment, an apparatus comprises one or more processors, a path detection unit and a Border Gateway protocol (BGP) unit, configured to perform respective processes described herein.

In an embodiment, a method comprises generating, at a data packet router, a first path advertisement comprising information about a first available path and determining a first originator identifier associated with the first path advertisement; and including the first originator identifier of the first available path as one of the attributes of the first path advertisement and transmitting the first path advertisement to clients.

In an embodiment, the method further comprises receiving a second path advertisement at the data packet router and not accepting the second path advertisement in response to determining that the second path advertisement comprises a second originator identifier of the second path advertisement and that the second originator identifier of the second path advertisement is the first originator identifier associated with the first path advertisement.

In an embodiment, the method is performed by the data packet router.

In an embodiment, the method further comprises accepting the path advertisement in response to determining that the second path advertisement comprises the second originator identifier of the second path advertisement but the second originator identifier is not the first originator identifier associated with the first path advertisement.

In an embodiment, the method further comprises modifying the second path advertisement to include a router identifier of the data packet router as one of attributes of the second path advertisement in response to determining that the second path advertisement does not comprise the second originator identifier of the second path advertisement.

In an embodiment, the method further comprises determining whether the second path advertisement comprises a border gateway protocol aggregator attribute (BGP_AGGREGATOR) value in the second path advertisement, and whether the BGP_AGGREGATOR value is an autonomous system identifier of an autonomous system that originated the second path advertisement.

In an embodiment, the second path advertisement further comprises a border gateway protocol aggregator attribute (BGP_AGGREGATOR) value indicating the originator of the second path advertisement.

In an embodiment, a non-transitory computer-readable storage medium stores one or more sequences of instructions which, when executed by one or more processors, cause the one or more processors to perform the processes described herein.

In an embodiment, an apparatus comprises one or more processors, a path detection unit and a Border Gateway protocol (BGP) unit, configured to perform respective processes described herein.

2.0 STRUCTURAL AND FUNCTIONAL OVERVIEW OF A SYSTEM

Figure 2:
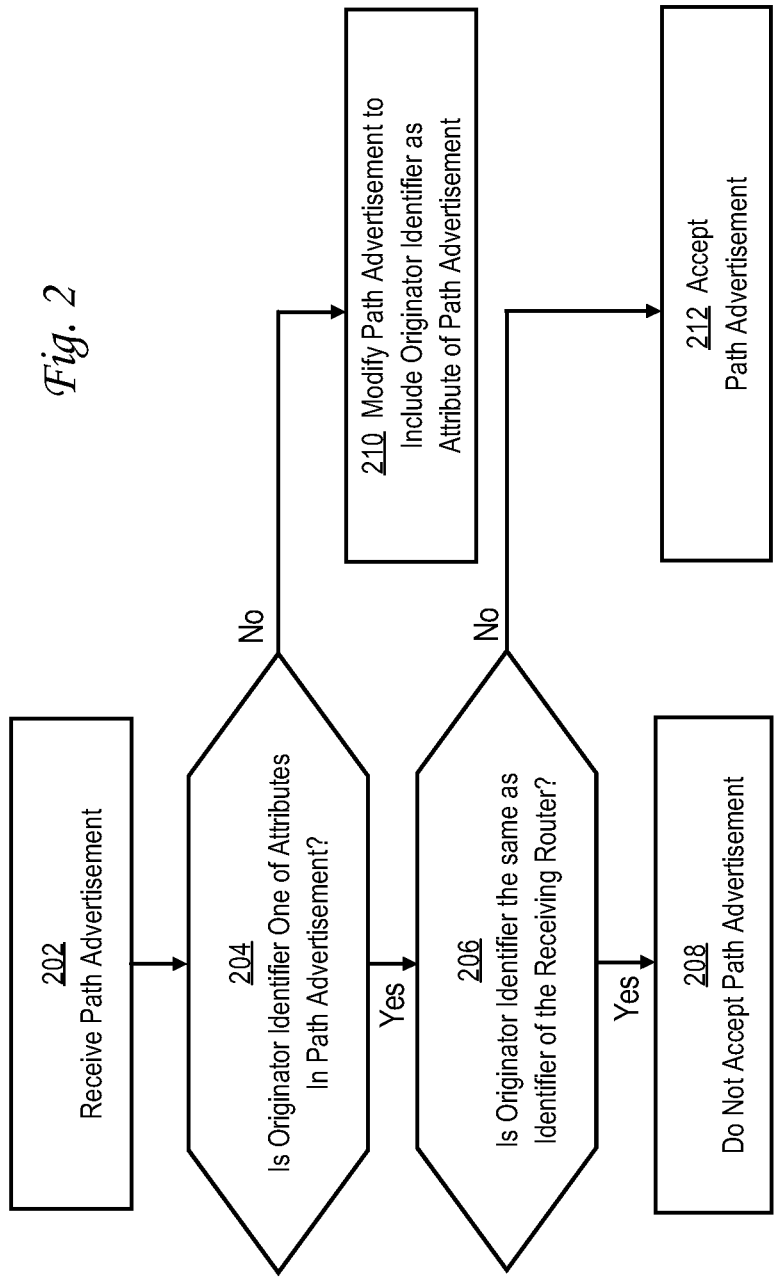
FIG. 2 illustrates an embodiment of a process of detecting and avoiding routing loops.
Figure 3:
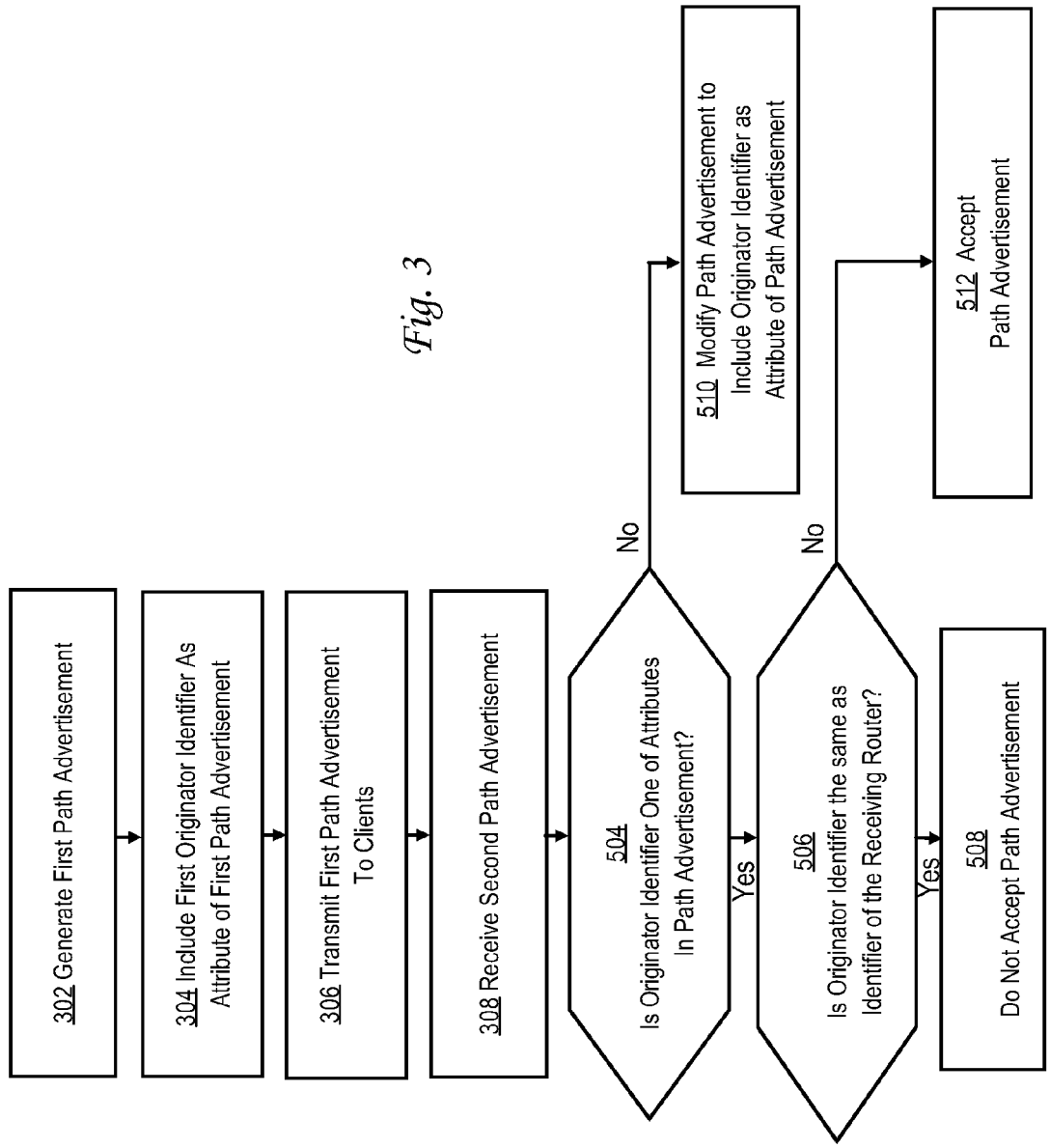
FIG. 3 illustrates an embodiment of a process of detecting and avoiding routing loops.

FIG. 1 illustrates an embodiment of route servers communicating with a route server client; FIG. 2 illustrates an embodiment of a process of detecting and avoiding routing loops; FIG. 3 illustrates an embodiment of a process of detecting and avoiding routing loops.

Referring first to FIG. 1, in an embodiment, a data processing system 100 comprises one or more route servers 120*a*, 120*b*, and a route server client 130. Route servers 120*a*, 120*b*, and a route server client 130 communicate over communication routes or paths. System 100 broadly represents one or more local networks, wide area networks, internetworks, or a combination. System 100 may represent one or more autonomous systems.

For purposes of illustrating clear examples, FIG. 1 shows details of two route servers 120*a*, 120*b*, and one route server client 130. However, practical embodiments may use any number of instances of route servers 120*a*, 120*b*, and any number of instances of router server client 130.

Route servers 120*a*, 120*b*, and route server client 130 may be implemented using any type of a computer, such as a special-purpose computer, router, switch or general purpose computer, and may use hardware logic such as in an application-specific integrated circuit (ASIC), field-programmable gate array (FPGA), system-on-a-chip (SoC) or other combinations of hardware, firmware and/or software.

In an embodiment, route servers 1201, 120*b*, and a route server client 130 are configured to exchange network reachability information with other devices connected to network 160. The reachability information is used to store data values in memory that represent a graph of connectivity between one or more autonomous systems within system 100 and connectivity between system 100 and other (not depicted in FIG. 1) autonomous systems and devices.

In certain embodiments, route servers 120*a*, 120*b*, and a route server client 130 comprise networking infrastructure elements such as any type of a router, switch, firewall or gateway, each of which may be implemented on one or more general-purpose computers hosting or executing data communication software implementing, for example, a router. Examples of routers may include Cisco 7600 Series Routers commercially available from Cisco Systems, Inc., San Jose, Calif.

Route servers 120*a*, 120*b*, and a route server client 130 may exchange routing information using various data communication protocols. For example, the routers may use an Exterior Gateway Protocol (EGP) routing protocol that allows a fully decentralized routing of the data. The routers may also be configured with software, firmware or hardware elements or a combination implementing protocols such as TCP/IP, MPLS and RSVP to facilitate data communication and resource utilization.

In an embodiment, routers in system 100 use BGP to exchange update messages about reachability of other autonomous systems. After a router in system 100 locally selects the best route to a given destination, the router sends the selected route to its peers with accompanying distance metrics and path attributes.

In an embodiment, route server 120*a* (120*b*, 130) comprises a path detection unit 122*a* (122*b*, 132, respectively), a Border Gateway Protocol (BGP) unit 124*a* (124*b*, 134) and an operating system unit 126*a* (126*b*, 136). Path detection logic 122*a* (122*b*, 132) comprises circuits or program instructions that are configured to perform the path detection functions, which are further described herein. BGP unit 124*a* (124*b*, 134) comprises circuits or program instructions which when executed implement BGP. Operating system unit 126*a* (126*b*, 136) comprises circuits or program instructions which, when executed, implement a device operating system. An example of operating system 126*s* (126*b*, 136) is Cisco IOS® Software Release 9.0, commercially available from Cisco Systems, Inc., San Jose, Calif.

In an embodiment, a BGP unit 124*a* (124*b*, 130) executes a Border Gateway Protocol (BGP).

Devices implementing BGP maintain a stored table of data values representing Internet Protocol (IP) addresses or "prefixes" that are reachable from a given autonomous system. Logic implementing BGP in a router makes routing decisions based on available paths, network policies and rule sets.

As the path (route) information travels through the network, each router along the path, except a router implementing route server extensions (as will be discussed below), prepends its unique autonomous system (AS) number to a list of autonomous systems in the BGP message. The list of the autonomous system numbers is often referred to as a route's AS_PATH attribute list.

In BGP, an AS_PATH attribute list comprises a sequence of intermediate autonomous system (AS) identifiers of the routers located between a source router and a destination router that form a directed route for routing data packets. The AS_PATH attribute is a list of AS numbers that a route has traversed in order to reach a destination.

An AS_PATH can be represented as an ordered AS_SEQUENCE or an unordered AS_SET. An AS_SET reduces the size of the AS_PATH information by listing each AS number only once, regardless of how many times it may have appeared in multiple AS_PATHs that were aggregated.

An AS_SET provides sufficient information for a router to avoid lopping of routing information. For example, when a BGP router propagates a route that the router learned from another BGP speaker's UPDATE message, the router modifies the route's AS_PATH attribute by adding the identifier of the router's autonomous system to the AS_PATH attribute, and sending the advertisement with the modified AS_PATH attribute to the peers. Upon receiving a route update, if the router determines that more than one instance of a particular AS number are present in the AS_PATH, then the router can determine that the advertisement is looped among the routers.

BGP route server extensions for route reflectors prohibit a BGP reflector from inserting its local autonomous system identifier (or a BGP group identifier) into an AS_PATH attribute list of a route advertisement. Because of the limitation, testing the presence of the autonomous system identifiers in the AS_PATH attribute list in the route advertisement may not conclusively detect routing loops.

Aggregation is a process of combining characteristics of several different routes in such a way that a single route can be advertised. Aggregation can occur as part of a decision process designed to reduce the amount of routing information that needs to be processed, disseminated and stored by routers.

BGP_AGGREGATOR is an optional transitive attribute that may be included in the route updates that are formed by an aggregation process. A BGP speaker that performs a route aggregation adds to the route advertisement the BGP_AGGREGATOR attribute containing the speaker's own autonomous system (AS) number and the speaker's IP address. For example, a BGP_AGGREGATOR attribute may contain the AS number of the last autonomous system that formed the AGGREGATOR route, followed by the IP address of the BGP speaker that formed the aggregated route.

In an embodiment, a BGP_AGGREGATOR attribute comprises information about an originator of the route advertisement, and not to indicate the autonomous system that performed the route aggregation. For example, a route reflector that reflects a received route advertisement may use the BGP_AGGREGATOR attribute as a placeholder to hold an identifier of the originator of the route advertisement, rather than to hold an identifier of the system that performed the aggregation.

In an embodiment, an originator identifier may be an identifier of the autonomous system or the BGP group to which the route reflector belongs and an IP address prefix of the route reflector.

In embodiments, the BGP_AGGREGATOR attribute is part of a loop detection process that is automatically performed by a route reflector.

Route aggregation may require a configuration modification on a server because the route aggregation requires configuring a router and modifying the routing information stored on the router. In contrast, the use of the BGP_AGGREGATOR attribute as described herein is performed automatically and does not require performing a configuration modification on the server.

In an embodiment, the use of the BGP_AGGREGATOR attribute herein maintains backward compatibility with BGP and conventional usage of the BGP_AGGREGATOR. In an embodiment, route aggregation may still be performed. Use of the BGP_AGGREGATOR attribute as described herein does not interfere with other usage of the value stored as the BGP_AGGREGATOR attribute for route aggregation.

Routers that receive a path advertisement comprising a BGP_AGGREGATOR attribute that indicates the originator of the path advertisement may construe that the paths have been already aggregated when the paths have not been aggregated. However, the confusion may be resolved by testing the routing information already stored in the router.

In an embodiment, a router that uses a BGP_AGGREGATOR attribute to indicate an originator of the route advertisement does not use the BGP_AGGREGATOR attribute to indicate that IP prefixes have been aggregated. Hence, the routers that receive the BGP_AGGREGATOR attribute meant to indicate the originator of the route advertisement do not apply a policy to aggregate the IP prefixes.

In an embodiment, a route-reflector client places an identifier of the route advertisement in the BGP_AGGREGATOR attribute for the purpose of loop prevention, not for the purpose of route aggregation.

In an embodiment, the BGP_AGGREGATOR attribute carries an identifier of an autonomous system to which the router that reflected the advertisement belongs. The router that reflected the advertisement places the router's autonomous system identifier in the BGP_AGGREGATOR attribute upon generating and reflecting the advertisement, not while aggregating routes.

In an embodiment, a route server 120a (120b) may generate and record the router's local autonomous systems identifier (AS) and append the identifier as a value in a BGP_AGGREGATOR attribute.

In an embodiment, a route server 120a (120b) may use an identifier of the BGP group to which the server belongs and append the identifier as a value in a BGP_AGGREGATOR attribute.

In an embodiment, a router server 120a (120b) may use a router identifier (routerID), such as the router's IP address prefix, and append the routerID as a value in a BGP_AGGREGATOR attribute.

In an embodiment, a route server 120a (120b), creates and appends the BGP_AGGREGATOR attribute to a route advertisement of a particular route; the value of the BGP_AGGREGATOR attribute may be an identifier of the autonomous system or the BGP group to which the router belongs and the router's identifier comprising the router's IP address prefix. The route advertisement comprising the BGP_AGGREGATOR attribute and the route information may be advertised to the router's clients.

In an embodiment, if for some reason, a route server client 130 sends the very same route advertisement back to route server 120a (120b), then route server 120a (120b) may use the BGP_AGGREGATOR attribute to detect whether the route advertisement has looped within the same autonomous system back to the route server.

If such a loop is detected, route server 120a (120b) may choose not to accept the advertisement that is being looped. By not accepting the advertisement, route server 120a (120b) may avoid processing of the advertisement, storing in a routing tables the information included in the advertisement and reflecting the redundant advertisement to the router's clients. By avoiding such processing, route server 120a (120b) may conserve its resources, such a CPU and memory.

In an embodiment, the process of detecting whether a route advertisement should be accepted or discarded may be performed by not only by router server 120a (120b), but also by a route server client 130.

3.0 PROCESS OF DETECTING AND AVOIDING ROUTING LOOPS

In an embodiment, when a route server client receives a path advertisement containing information about an available path, the route server client tests whether an originator identifier of the available path advertisement has been already inserted as one of the attributes of the path advertisement, and if so, whether the originator identifier corresponds to the router's own identifier. If the route server client receives a path advertisement containing the originator identifier that matches the router's own identifier, then the route server client may be determine that the route server client received the particular path advertisement for at least a second time. In response, the particular path advertisements may be discarded, as they were already processed by the router in the past. By not accepting the looped advertisement, the router may conserve computational and storage resources.

FIG. 2 illustrates an embodiment of a process of detecting and avoiding routing loops by routers implementing BGP route server extensions.

In step 202, a router receives a path advertisement with information about an available path or route. In an embodiment, the router is a route reflector that implements BGP route server extensions, or any other device that implements the BGP router server extensions.

In an embodiment, upon receiving a path advertisement containing information about an available path, a router determines an originator of the path advertisement.

In step 204, a router tests whether an originator identifier of the advertised available route is included as one of the attributes in the advertisement.

In an embodiment, if an originator identifier is included as an attribute in a route advertisement, the originator identifier is the value of the BGP_AGGREGATOR attribute.

In an embodiment, an originator identifier of the originator of the path advertisement may be an identifier of the autonomous system or the BGP group to which the router that received the route advertisement belongs. The autonomous system identifier may be the autonomous system number (ASN), or any other identifier used to indicate a particular autonomous system.

In an embodiment, an originator identifier of the originator of the path advertisement may also include an IP address prefix of the router that received the route advertisement.

If an originator identifier is included in one of the attributes in the path advertisement, then step 206 is performed. Otherwise, the process proceeds to step 210.

Step 210 is performed upon determining that the received route advertisement did not contain an identifier of the originator of the path advertisement. For example, the router may have determined that a BGP_AGGREGATOR attribute did not have a set value corresponding to the originator identifier, or that the value included in the BGP_AGGREGATOR attribute did not correspond to any valid identifier of the autonomous system or any valid identifier of the BGP group. This may occur when the particular route advertisement was received by the router for the first time, or when the particular route advertisement was received by the particular autonomous system for the first time. Such a particular route advertisement might have never been reflected within the particular autonomous system.

In step 210, a router modifies the received path advertisement to include an originator identifier as one of the attributes of the path advertisement. For example, the router may enter an identifier of the autonomous system to which the router belongs as a value of the BGP_AGGREGATOR attribute. According to another example, the router may enter a BGP group identifier of the group to which the router belongs as a value of the BGP_AGGREGATOR attribute. The router may also append an IP address prefix of the router to the value already entered to the BGP_AGGREGATOR attribute.

Once the path advertisement is modified to include the originator identifier as one of the attributes of the path advertisement, the modified path advertisement may be advertised or reflected to other servers. For example, referring again to FIG. 1, if the process is performed by a route server client 130, then the modified path advertisement may be sent to route servers 120a and 120b that are communicatively coupled with the route server client 130. Similarly, if the process is performed by a route server 120a (or 120b) of FIG. 1, then the modified path advertisement may be sent to a route server client 130 and a route server 120b (or 120a, respectively).

However, if an originator identifier of the advertised available path was included in the path advertisement, then in step 206, after a router determined that the received route advertisement contained an identifier of the originator of the path advertisement, the router determines whether the originator identifier is valid and whether the originator identifier is the same as an identifier of the receiving router.

In an embodiment, the router may determine whether a value stored in a BGP_AGGREGATOR attribute corresponds to a valid identifier of the autonomous system or a valid identifier of the BGP group. If the originator identifier is valid, then the router may determine whether the originator identifier is the same as the identifier of the router. Hence, the router may choose not to process the same advertisement again to conserve computational and storage resources.

In an embodiment, a router determines whether an originator identifier is the same as an identifier of the router. For example, upon determining that the originator identifier specifies the router, then the router may determine that the route advertisement has been already processed or reflected by the router or that the route advertisement has been already disseminated within the autonomous system to which the router belongs.

In an embodiment, a router identifier may be any value that uniquely identifies the router and/or the router's autonomous system. For example, the identifier may be an identifier of the autonomous system to which the router belongs, or an identifier of the BGP group to which the router belongs, combined with an IP address prefix associated with the router.

If a router determines that the originator identifier included in the route advertisement matches the router's own identifier, then at step 208, the router may choose not to accept the route advertisement. Otherwise, step 212 is performed.

Step 212 may occur when the route advertisement has not disseminated or reflected within an autonomous system or a BGP group to which the router belongs.

In step 212, a router accepts the received path advertisement, processes it, and reflects the advertisement to its clients. Processing of the received path advertisement may include creating an originator identifier and including the originator identifier as a value of a BGP_AGGREGATOR attribute of the route advertisement as described above.

FIG. 3 illustrates an embodiment of a process of detecting and avoiding loops by routers implementing BGP route server extensions.

In step 302, a router generates a first path advertisement comprising information about an available path based on the information that the router received from other routers or other sources. It is assumed that the first path advertisement has not yet been disseminated within the autonomous system to which the router belongs.

In an embodiment, the router may be a route reflector that implements BGP route server extensions or any other device that implements the BGP route server extensions.

In step 304, a router includes a first originator identifier as a value of one of the attributes included in the first path advertisement. In an embodiment, the first originator identifier may comprise two components: an identifier of the autonomous system to which the router belongs, and a router identifier. Examples of the first originator identifier include an identifier of the autonomous system to which the router belongs or an identifier of the BGP group to which the router belongs, combined with an IP address prefix of the router, or any other identifier that uniquely identifies the router in the system.

In an embodiment, the originator identifier is included as a value of one of the attributes that are part of the first path advertisement. For example, the router may use a BGP_AGGREGATOR attribute as a place holder for the originator identifier.

In step 306, a router transmits the first path advertisement to clients. For example, the first path advertisement may be disseminated to other route servers, other route server clients, external BGP clients, or routers implementing BGP route server extensions.

In step 308, a router receives a second path advertisement containing information about a second available path. Upon receiving a second path advertisement containing information about a second available path, a router ascertains an originator of the second path advertisement.

In step 504, a router tests whether an originator identifier of the originator of the second available route is included as one of the attributes in the advertised path. For example, the originator identifier may be entered as a value into a BGP_AGGREGATOR attribute that is part of the second path advertisement. The originator of the path advertisement may be an identifier of the autonomous system or the BGP group to which the router that received the route advertisement belongs, combined with an identifier of an IP address prefix of the router that received the second path advertisement.

If an originator identifier is included in one of the attributes in the path advertisement, then the router proceed to performing step 506. Otherwise, the router proceeds to step 510.

In step 510, a router modifies the second path advertisement to include an originator identifier as one of the attributes of the second path advertisement. For example, the router may enter the identifier of the autonomous system to which the router belongs and an IP prefix of the router as a value of the BGP_AGGREGATOR attribute.

Once the second path advertisement is modified to include the originator identifier as one of the attributes of the path advertisement, the modified second path advertisement may be processed and reflected to other servers.

However, if an originator identifier of the second path was already included in the second path advertisement, then at step 506, the router determines whether the originator identifier is valid and whether the originator identifier is the same as an identifier of the receiving router.

In an embodiment, a router may determine whether a value stored in a BGP_AGGREGATOR attribute corresponds to a valid identifier of the autonomous system or a valid identifier of the BGP group, and if so, the router may compare its own identifier with the originator identifier included in the second route advertisement. If there is a match, then the router may determine that the route advertisement has been already reflected by the router or that the route advertisement has been already disseminated within the autonomous system to which the router belongs.

In an embodiment, the router's own identifier may be an identifier of the autonomous system to which the router belongs or an identifier of the BGP group to which the router belongs, combined with an IP address prefix associated with the router.

If the router determines that the originator identifier included in the second route advertisement matches the router's own identifier, then the router proceeds to step 508, in which, the router may choose not to accept the route advertisement, as described above. Otherwise, the router may proceed to step 512.

The router proceeds to step 512 upon determining that a received route advertisement comprised an identifier of the route's originator; however, the originator identifier did not match the identifier of the router. This may happen when the route advertisement has not been disseminated within an autonomous system or a BGP group to which the router belongs.

In step 512, a router accepts the received path advertisement, processes it, and reflects the advertisement to its clients. Processing of the received path advertisement may include creating an originator identifier as described above.

4.0 IMPLEMENTATION MECHANISMS

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
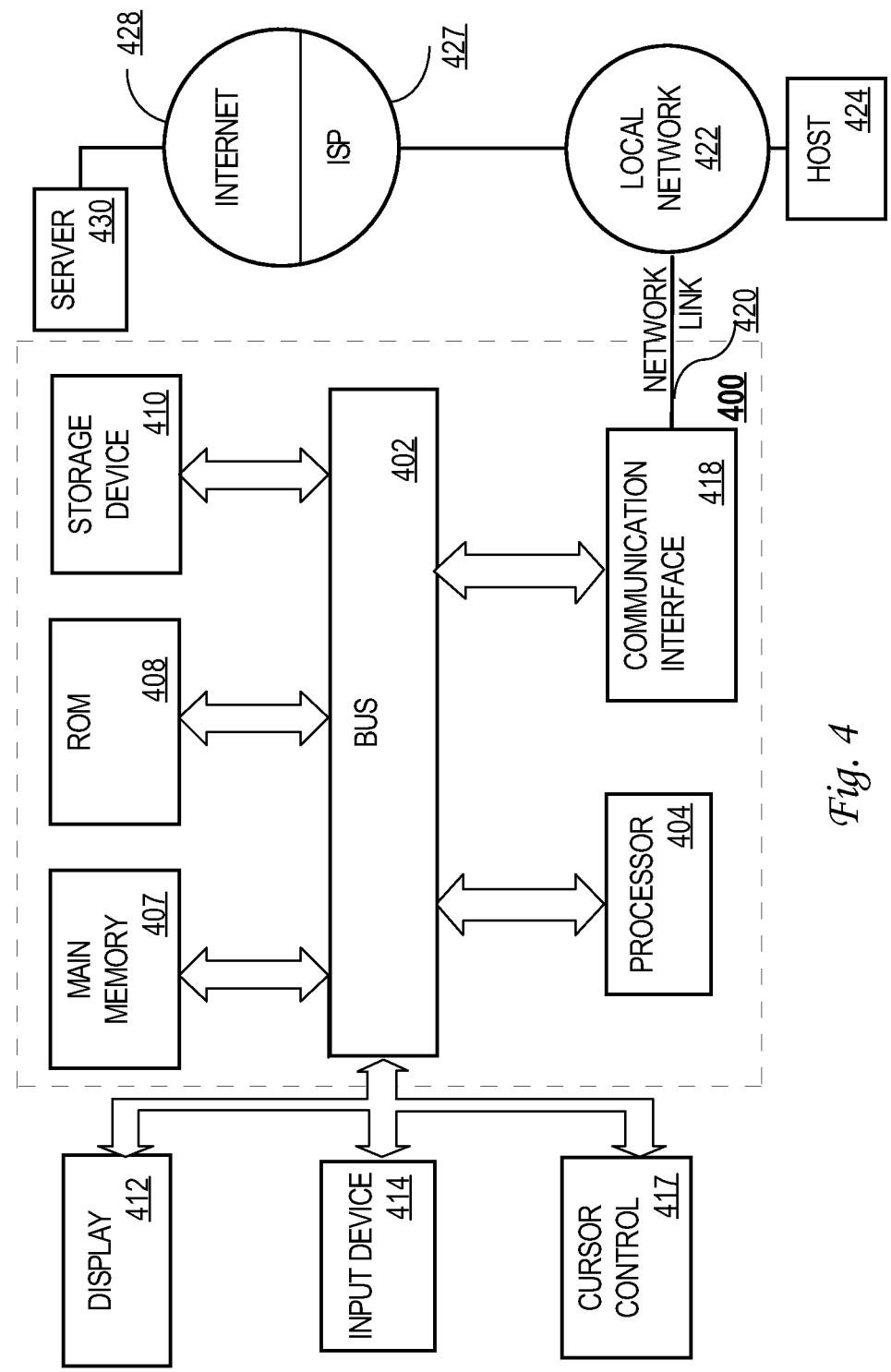
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5.0 EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:
   receiving, at a data packet router that is configured as a route reflector, a path advertisement comprising information about an available path;
   determining whether the path advertisement comprises a border gateway protocol aggregator attribute value;
   in response to determining that the path advertisement comprises the border gateway protocol aggregator attribute value, determining whether the border gateway protocol aggregator attribute value in the path advertisement comprises an originator identifier of an originator of the available path;
   in response to determining that the path advertisement comprises the originator identifier of the originator of the available path, determining whether the originator identifier of the available path is a router identifier of the route reflector, and in response to determining that the originator identifier of the available path is the router identifier of the route reflector, not accepting the path advertisement;
   wherein the router identifier of the data packet router comprises an autonomous system (AS) number for an AS containing the data packet router and an Internet Protocol (IP) prefix of the data packet router;
   wherein the method is performed by one or more processors of the data packet router.

2. The method of claim 1, further comprising:
   in response to determining that the path advertisement does not comprise the originator identifier of the originator of the available path, modifying the path advertisement to include the router identifier of the data packet router as one of attributes of the path advertisement;
   in response to determining that the path advertisement comprises the originator identifier of the originator of the available path but the originator identifier of the available path is not the router identifier of the data packet router, accepting the path advertisement.

3. A non-transitory computer-readable storage medium storing one or more sequences of instructions which, when executed by one or more processors comprising a data packet router, cause the one or more processors to perform:
   receiving, at the data packet router that is configured as a route reflector, a path advertisement comprising information about an available path;
   determining whether the path advertisement comprises a border gateway protocol aggregator attribute value;
   in response to determining that the path advertisement comprises the border gateway protocol aggregator attribute value, determining whether the border gateway protocol aggregator attribute value in the path advertisement comprises an originator identifier of an originator of the available path;
   in response to determining that the path advertisement comprises the originator identifier of the originator of the available path, determining whether the originator identifier of the available path is a router identifier of the route reflector, and in response to determining that the originator identifier of the available path is the router identifier of the route reflector, not accepting the path advertisement;
   wherein the originator identifier of the available path comprises an autonomous system (AS) number for an AS containing the data packet router and an Internet Protocol (IP) prefix of the data packet router.

4. The computer-readable medium of claim 3, further comprising instructions which, when executed by the one or more processors, cause the one or more processors to perform:
   in response to determining that the path advertisement does not comprise the originator identifier of the originator of the available path, modifying the path advertisement to include the router identifier of the data packet router as one of attributes of the path advertisement;
   in response to determining that the path advertisement comprises the originator identifier of the originator of the available path but the originator identifier of the available path is not the router identifier of the data packet router, accepting the path advertisement.

5. An apparatus, comprising:
   one or more processors;
   a path detection unit configured to receive, at a data packet router that is configured as a route reflector, a path advertisement comprising information about an available path;

a Border Gateway Protocol (BGP) unit configured to perform:
- determining whether the path advertisement comprises a border gateway protocol aggregator attribute value;
- in response to determining that the path advertisement comprises the border gateway protocol aggregator attribute value, determining whether the border gateway protocol aggregator attribute value in the path advertisement comprises an originator identifier of an originator of the available path;
- in response to determining that the path advertisement comprises the originator identifier of the originator of the available path, determining whether the originator identifier of the available path is a router identifier of the route reflector, and in response to determining that the originator identifier of the available path is the router identifier of the route reflector, not accepting the path advertisement;
- wherein the router identifier of the data packet router comprises an autonomous system (AS) number for an AS containing the data packet router and an Internet Protocol (IP) prefix of the data packet router.

6. The apparatus of claim 5, wherein the BGP unit is further configured to perform:
- in response to determining that the path advertisement does not comprise the originator identifier of the originator of the available path, modifying the path advertisement to include the router identifier of the data packet router as one of attributes of the path advertisement;
- in response to determining that the path advertisement comprises the originator identifier of the originator of the available path but the originator identifier of the available path is not the router identifier of the data packet router, accepting the path advertisement.

7. A method comprising:
- generating, at a data packet router that is configured as a route reflector, a first path advertisement comprising information about a first available path and determining a first originator identifier associated with the first path advertisement;
- including the first originator identifier of the first available path as one of attributes of the first path advertisement and transmitting the first path advertisement to other routers;
- in response to receiving a second path advertisement at the data packet router:
  - determining whether the second path advertisement comprises a border gateway protocol aggregator attribute value;
  - in response to determining that the second path advertisement comprises the border gateway protocol aggregator attribute value, determining whether the border gateway protocol aggregator attribute value in the second path advertisement comprises a second originator identifier of the second path advertisement and that the second originator identifier of the second path advertisement is the first originator identifier of the route reflector and associated with the first path advertisement, not accepting the second path advertisement;
- wherein the first originator identifier of the data packet router comprises an autonomous system (AS) number for an AS containing the data packet router and an Internet Protocol (IP) prefix of the data packet router;
- wherein the method is performed by the data packet router.

8. The method of claim 7, further comprising:
- in response to determining that the second path advertisement comprises the second originator identifier of the second path advertisement but the second originator identifier is not the first originator identifier associated with the first path advertisement, accepting the path advertisement;
- in response to determining that the second path advertisement does not comprise the second originator identifier of the second path advertisement, modifying the second path advertisement to include a router identifier of the data packet router as one of attributes of the second path advertisement.

9. A non-transitory computer-readable storage medium storing one or more sequences of instructions which, when executed by one or more processors comprising a data packet router, cause the one or more processors to perform:
- generating, at the data packet router that is configured as a route reflector, a first path advertisement comprising information about a first available path and determining a first originator identifier associated with the first path advertisement;
- including the first originator identifier of the first available path as one of attributes of the first path advertisement and transmitting the first path advertisement to other routers;
- in response to receiving a second path advertisement at the data packet:
  - determining whether the second path advertisement comprises a border gateway protocol aggregator attribute value;
  - in response to determining that the second path advertisement comprises the border gateway protocol aggregator attribute value, determining whether the border gateway protocol aggregator attribute value in a second originator identifier is the first originator identifier of the route reflector and associated with the first path advertisement, not accepting the second path advertisement;
- wherein the first originator identifier of the data packet router comprises an autonomous system (AS) number for an AS containing the data packet router and an Internet Protocol (IP) prefix of the data packet router.

10. The computer-readable medium of claim 9, further comprising instructions which, when executed by the one or more processors, cause the one or more processors to perform:
- in response to determining that the second path advertisement comprises the second originator identifier of the second path advertisement but that the second originator identifier of the second path advertisement is not the first originator identifier associated with the first path advertisement, accepting the path advertisement;
- in response to determining that the second path advertisement does not comprise the second originator identifier of the second path advertisement, modifying the second path advertisement to include a router identifier of the data packet router as one of attributes of the second path advertisement.

11. An apparatus, comprising:
- one or more processors;
- a path detection unit configured to generate, at a data packet router that is configured as a route reflector, a first path advertisement comprising information about a first available path and determining a first originator identifier associated with the first path advertisement;

a Border Gateway Protocol (BGP) unit configured to:
include the first originator identifier of the first available path as one of attributes of the first path advertisement and transmitting the first path advertisement to other routers;
receive a second path advertisement at the data packet router;
not accept the second path advertisement in response to determining that the second path advertisement comprises a border gateway protocol aggregator attribute value and the border gateway protocol aggregator attribute value in the second path advertisement comprises a second originator identifier of the second path advertisement and that the second originator identifier is the first originator identifier of the route reflector and associated with the first path advertisement;
wherein the first originator identifier of the data packet router comprises an autonomous system (AS) number for an AS containing the data packet router and an Internet Protocol (IP) prefix of the data packet router.

12. The apparatus of claim 11, wherein the BGP unit is further configured to:
accept the second path advertisement in response to determining that the second path advertisement comprises the second originator identifier of the second path advertisement but that the second originator identifier of the second path advertisement is not the first originator identifier associated with the first path advertisement;
modify the second path advertisement to include a router identifier of the data packet router as one of attributes of the second path advertisement in response to determining that the second path advertisement does not comprise the second originator identifier of the second path advertisement.

* * * * *